United States Patent
Kumar et al.

(10) Patent No.: US 9,948,150 B2
(45) Date of Patent: Apr. 17, 2018

(54) SYSTEMS AND METHODS FOR CONSTRUCTING LAMINATIONS FOR ELECTRIC MOTORS

(71) Applicant: Baker Hughes Incorporated, Houston, TX (US)

(72) Inventors: Deepak Kumar, Houston, TX (US); Carlos A. Prieto, Houston, TX (US); Zhiyue Xu, Cypress, TX (US); Michael H. Johnson, Katy, TX (US)

(73) Assignee: Baker Hughes Incorporated, Houston, TX (US)

( * ) Notice: Subject to any disclaimer, the term of this patent is extended or adjusted under 35 U.S.C. 154(b) by 352 days.

(21) Appl. No.: 14/847,884

(22) Filed: Sep. 8, 2015

(65) Prior Publication Data
US 2016/0072342 A1   Mar. 10, 2016

Related U.S. Application Data

(60) Provisional application No. 62/047,439, filed on Sep. 8, 2014.

(51) Int. Cl.
*H02K 1/02* (2006.01)
*B22F 7/00* (2006.01)
(Continued)

(52) U.S. Cl.
CPC .............. *H02K 1/02* (2013.01); *B22F 7/002* (2013.01); *H01F 1/24* (2013.01); *H01F 3/10* (2013.01);
(Continued)

(58) Field of Classification Search
CPC ... H02K 1/00; H02K 1/02; H02K 1/04; H01F 1/24; H01F 3/10; B22F 7/002
(Continued)

(56) References Cited

U.S. PATENT DOCUMENTS 6,144,130 A * 11/2000 Kawamura ............ H02K 1/278
                                                           310/156.12
6,499,209 B1 * 12/2002 Landin .................... H02K 1/04
                                                           29/596
(Continued)

FOREIGN PATENT DOCUMENTS

JP          05090019 A  *  4/1993  ............... H01F 1/24
JP       2011216745 A  * 10/2011  ............... H01F 1/24

OTHER PUBLICATIONS

Rutz, et al., "The Manufacture of Electromagnetic Components by the Powder Metallurgy Process", PM2TEC '97, Intl. Conf. on Powder Metallurgy & Particulate Matls., Jun. 29, 1997.

*Primary Examiner* — Tran Nguyen
(74) *Attorney, Agent, or Firm* — Law Offices of Mark L. Berrier

(57) ABSTRACT

Systems and methods for the construction of components such as laminations for the stator core of an ESP motor wherein particles of different materials are mixed and pressed together at an elevated temperature to form a composite material in the desired lamination shape. The materials are selected to provide characteristics such as high magnetic permeability from one material and high thermal conductivity from the other material. The particles of the different materials are pressed together at a temperature that is sufficiently high to fuse the particles together and form a composite material, but is also sufficiently low that the materials are not sintered. The individual materials therefore retain their original characteristics, and the composite material benefits from the high magnetic permeability of the first material and the high thermal conductivity of the other material.

19 Claims, 4 Drawing Sheets

(51) Int. Cl.
*H01F 1/24* (2006.01)
*H01F 3/10* (2006.01)
*B22F 1/00* (2006.01)
*B22F 3/11* (2006.01)
*H01F 41/02* (2006.01)

(52) U.S. Cl.
CPC .............. *B22F 1/0003* (2013.01); *B22F 3/11* (2013.01); *C22C 2202/02* (2013.01); *H01F 41/0246* (2013.01); *H01F 2003/106* (2013.01)

(58) Field of Classification Search
USPC ........... 310/216; 29/150, 427–428, 596–598, 29/609; 428/457, 369, 704, 900, 928; 257/E23.107, E23.112; 427/126.1–126.6, 427/128, 131, 132, 209, 404, 407.1, 427/419.2, 419.3, 419.7
See application file for complete search history.

(56) References Cited

U.S. PATENT DOCUMENTS

| | | | |
|---|---|---|---|
| 6,962,753 B1* | 11/2005 | Yoshida | H01L 23/3733 257/E23.107 |
| 7,495,538 B2* | 2/2009 | Tsunemi | H01F 3/10 336/84 M |
| 7,679,255 B2* | 3/2010 | Evans | H02K 1/148 310/216.066 |
| 8,697,225 B2* | 4/2014 | Aramaki | B22F 7/04 156/245 |
| 2002/0053854 A1 | 5/2002 | Kanno | |
| 2007/0222306 A1* | 9/2007 | Hultman | H02K 1/02 310/44 |
| 2009/0079528 A1 | 3/2009 | Shabany | |
| 2009/0269224 A1 | 10/2009 | Hunt | |
| 2013/0288079 A1 | 10/2013 | Chang | |
| 2013/0294899 A1 | 11/2013 | Jones | |

* cited by examiner

SYSTEMS AND METHODS FOR CONSTRUCTING LAMINATIONS FOR ELECTRIC MOTORS

CROSS-REFERENCE TO RELATED APPLICATIONS

This application claims the benefit of U.S. Provisional Patent Application 62/047,439, filed Sep. 8, 2014, by Kumar, et al., which is incorporated by reference as if set forth herein in its entirety.

BACKGROUND

1. Field of the Invention

The invention relates generally to the construction of electric motors, and more particularly to systems and methods for constructing ferromagnetic laminations that are used to build the cores of electric motors, where the laminations are constructed using powder metallurgy techniques.

2. Related Art

A typical electric motor has two primary components: a rotor; and a stator. The stator remains stationary, while the rotor rotates with respect to the stator. In an AC induction motor, magnetic fields generated by the stator induce currents in the rotor. These currents in turn generate magnetic fields that interact with those of the stator. The interaction of the magnetic fields created by the stator and the rotor cause the rotor to rotate with respect to the stator.

Induction motors are commonly used in downhole motors that drive electric submersible pumps (ESP's). Typically, the stator of an ESP motor is constructed by positioning coils (windings) of insulated wire in slots in a ferromagnetic stator core. When electric current is passed through the wire, magnetic fields are generated around the wire and consequently in the ferromagnetic stator core. Changing the magnitude and direction of the current changes the magnitude and polarity of the magnetic fields generated by the stator.

AC electric motors, including motors that are used to drive ESP's, commonly include a stator core that is manufactured using ferromagnetic laminations. The laminations are electrically insulated from each other in order to prevent currents (known as eddy currents) from circulating through the stator core. These currents reduce the efficiency of the motor and increase the heat generated in the motor.

The laminations are typically stamped from thin sheets of metal. The particular metal that is used is selected based in part on its magnetic and thermal properties. Ideally, the metal would have high magnetic permeability and high thermal conductivity, but in practice, it is often necessary to select a metal that has a balance of these properties. In other words, it may be desirable to select a metal that has moderate magnetic permeability and thermal conductivity, rather than one that has a very high magnetic permeability but a low thermal conductivity (or one that has a high thermal conductivity but a low magnetic permeability).

It would be desirable to provide means to allow a designer of a downhole motor to have the best of both worlds—the high magnetic permeability of one metal and the high thermal conductivity of a different metal.

SUMMARY OF THE INVENTION

This disclosure is directed to systems and methods for the construction of components for an electric motor that solve one or more of the problems discussed above. These systems and methods can be used to manufacture, for example, laminations for the magnetic core of a stator by mixing particles of different materials and pressing the particles together at an elevated temperature into the desired lamination shape. The materials are selected to provide desirable characteristics, such as high magnetic permeability in one material and high thermal conductivity in another material. The particles of the different materials are pressed together at a temperature that is sufficiently high to fuse the particles together and form a composite material, but is also sufficiently low that the materials are not sintered. The individual materials therefore retain their original characteristics, and the composite material benefits from the high magnetic permeability of the first material and the high thermal conductivity of the other material.

One particular embodiment is a method for manufacturing magnetic stator core laminations. In this method, two materials are provided: a first material having a high magnetic permeability; and a second material having a high thermal conductivity. The materials may be provided in a powered form having particles that are approximately 100 microns in diameter. These particles are mixed together and are then pressed together. The particles of the first and second materials may be mixed with a binder and milled to facilitate their mixing. In an alternative embodiment, the particles of one material may be coated with the other material before the particles are pressed together. The coating may be relatively uniform, so that each particle of the first material is entirely coated with the second material, or it may be lass uniform, so that the surface of each particle is not completely covered. The particles are pressed together at an elevated temperature so that the particles fuse together without sintering, which would cause the two materials to mix together and lose their original characteristics. The specific temperature or temperature range that is used will depend upon the particular materials that are used. The particles are pressed into a desired shape, which in this case is a magnetic stator core lamination. A first portion of the total volume of the composite material (the lamination) comprises the first material and a second portion of the total volume comprises the second material. The composite material may also include some voids that occupy a third portion (e.g., between 1 and 2 percent) of the total volume, and which may provide additional electrical resistivity in the composite material.

The invention may include various other embodiments as well. For example, one embodiment may be an electric submersible pump (ESP) motor that uses laminations formed by processes such as are described above. The ESP motor has a stator core that in which a plurality of laminations are stacked together in a stator housing. Each lamination is formed of a composite material in which particles of two different materials are fused together. In the composite material, the first material makes up a first portion of the total volume of the composite material, and the second material makes up a second portion of the total volume. A small portion of the volume of the composite material may be occupied by voids. In this embodiment, the first material has a high magnetic permeability and the second material has a high thermal conductivity. Because the first and second materials retain their distinct characteristics, the composite material has a high magnetic permeability from the first material and a high thermal conductivity from the second material.

Numerous other embodiments are also possible.

BRIEF DESCRIPTION OF THE DRAWINGS

Other objects and advantages of the invention may become apparent upon reading the following detailed description and upon reference to the accompanying drawings.

Figure 1:
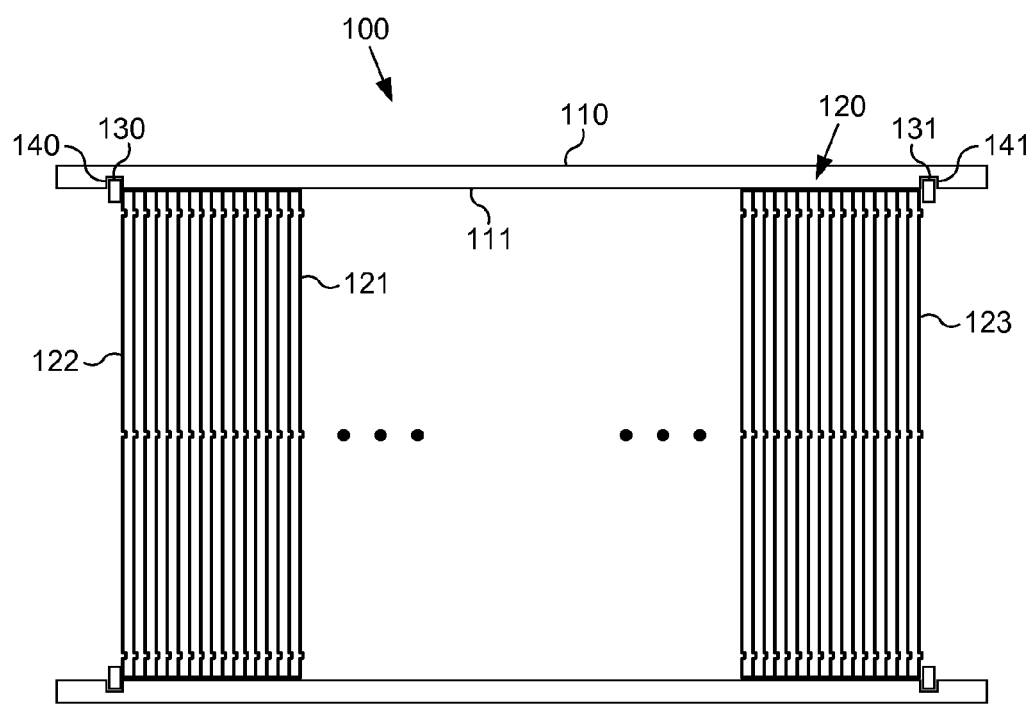
FIG. 1 is a diagram illustrating the general structure of a stator core in one embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined herein.

DESCRIPTION OF EXEMPLARY EMBODIMENTS

One or more embodiments of the invention are described below. It should be noted that these and any other embodiments described below are exemplary and are intended to be illustrative of the invention rather than limiting.

As described herein, various embodiments of the invention comprise systems and methods for construction of downhole electric motors in which the laminations of a stator core are formed by pressing together two powdered materials, where a first one of the materials has a high magnetic permeability and the second material has a high thermal conductivity. The materials may be mixed together, or one may be coated with the other (preferably, the first material is coated with the second) before they are pressed together at an elevated temperature to fuse the particles of the materials to each other. The temperature is low enough that the two materials retain their individual characteristics and thereby provide the composite material with both high magnetic permeability and high thermal conductivity.

As noted above, the specific temperature at which the particles are fused together may vary depending upon the particular materials and the particular process parameters being used (e.g., the amount of time during which the materials are pressed together). For example, the sintering temperatures of some common materials are: iron/steel, 1100-1300 C; aluminum alloys, 590-620 C; copper, 750-1000 C; brass, 850-950 C; bronze, 740-780 C. If any of these materials are used in the present processes, temperatures below the respective sintering temperatures would preferably be used so that the materials would fuse together at the interfaces between the particles without melting into each other. The temperature used in the process may be selected based in part on other considerations as well, such as thermal input cost and processing time.

It should be noted that the stacked-lamination construction described herein may be applicable to generators and transformers as well as motors. The exemplary stator core described below is intended to illustrate the structure and use of laminations formed with powdered metallurgy techniques. It should also be noted that, while the examples below combine two different materials to provide advantageous characteristics of those two materials, alternative embodiments may use three or more different types of materials, each of which maintains its characteristics when the materials are fused together.

Referring to FIG. 1, a diagram illustrating the structure of a stator core for a downhole motor in accordance with one embodiment is shown. FIG. 1 is a cross-sectional view of stator core 100. Stator core 100 includes a tubular stator housing 110 and a stack 120 of conductive laminations (e.g., 121) that are positioned within the housing. The laminations in this embodiment are all identical. A pair of snap rings 130 and 131 are positioned at the ends of stack 120. Snap rings 130 and 131 are seated within corresponding grooves 140 and 141 in the inner surface 111 of housing 110. The snap rings may be welded to the housing and/or to the laminations (122, 123) at the ends of stack 120 in order to retain the snap rings and to resist rotation of the stacked laminations within the housing.

Figure 3:
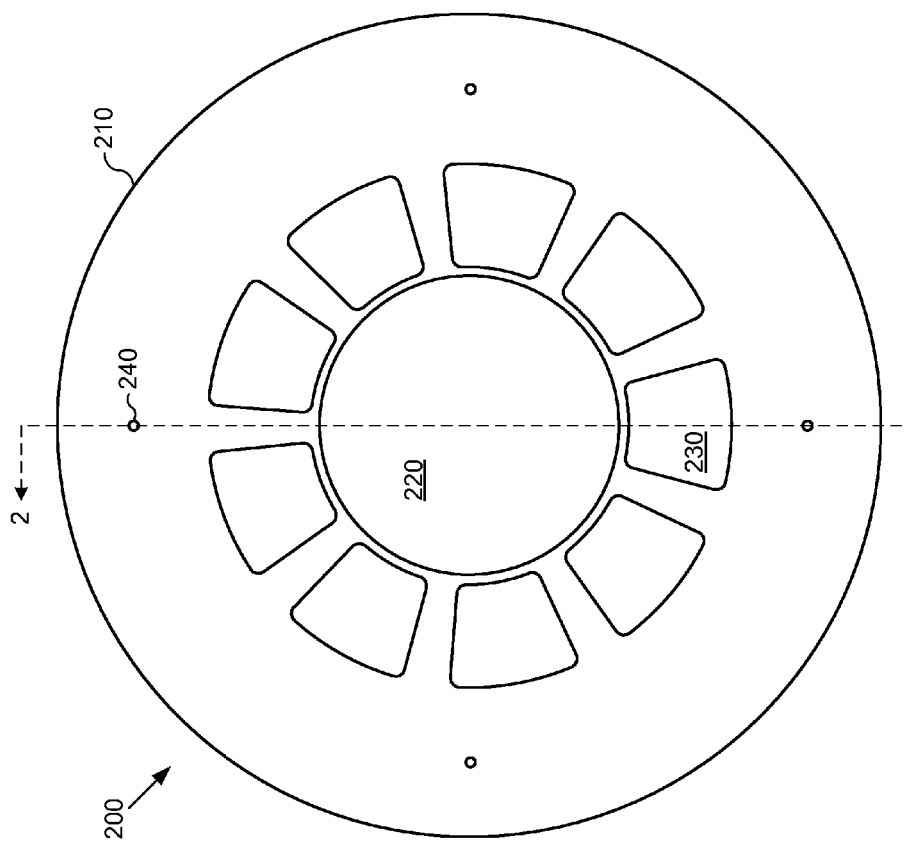
FIGS. 2 and 3 are diagrams illustrating the configuration of a lamination for a closed-slot stator core in one embodiment.
Figure 2:
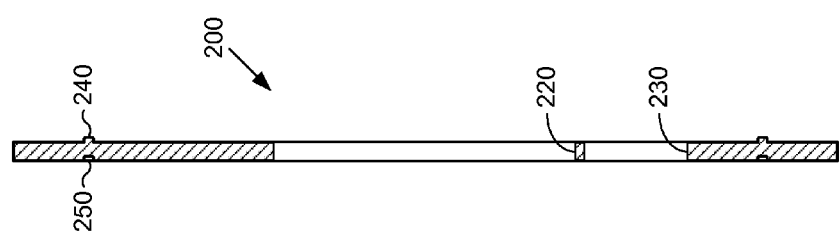

Referring to FIGS. 2 and 3, a lamination suitable for use in stator core 100 is shown. Each lamination is a thin disk which has the shape of a cross-section of the stator core. The laminations are electrically conductive, and may have a thin layer of varnish or other non-conductive material in the form of a coating or cladding which separates the laminations when they are stacked together. While the lamination depicted in these figures form a closed-slot stator core, it should be noted that this lamination is merely exemplary, and in other embodiments, the laminations may be configured to form an open-slot stator core.

Lamination 200 is generally annular, having a circular outer edge 210 and an inner aperture 220. When multiple laminations are stacked together, the outer edges of the laminations form a cylindrical outer surface of substantially the diameter as the inner surface 111 of stator housing 110. The inner apertures of the stacked laminations form the bore of the stator, within which the rotor of the motor will be positioned in the assembled motor.

Lamination 200 is configured to form a closed-slot stator core. This type of stator core has a set of passageways or "slots" which extend through the stator core. Magnet wire will later be threaded through these slots to form stator windings. Lamination 200 therefore includes a plurality of slot apertures (e.g., 230) that will form slots of the stator core. Lamination 200 may be flat, or it may include one or more "dimples" or similar interlocking structures. Each dimple has a bump (e.g., 240) on one side of the lamination and a corresponding depression (e.g., 250) on the opposite side of the lamination. The dimples interlock to prevent each of the laminations from rotating with respect to the adjacent laminations.

While laminations are conventionally manufactured by such methods as stamping them from a sheet of a desired metal, the laminations of the present embodiments are manufactured using powder metallurgy techniques. These techniques are used to press particles of two different materials together to form a composite material that has advantageous properties of both of the individual materials that form the composite.

Because it is desired for the laminations of the ESP motor to have both high magnetic permeability and high thermal conductivity, the composite includes a first, "soft magnetic" material that has a very high magnetic permeability, and a second material that has a high thermal conductivity. The material that has the high magnetic permeability will typically have a relatively low thermal conductivity, and the material that has the high thermal conductivity will typically have a relatively low magnetic permeability.

In one embodiment, the first material has a magnetic permeability that is at least 3000 SI units, and preferably is closer to 6000 SI units. Some examples of the soft magnetic materials that may be used to form the composite include Metglass, Permendur, Permalloy, Supermalloy, Mu-metal, and Nanoperm. New alloys having high magnetic permeability may also be made by combining elements such as iron, cobalt, nickel, silicon, vanadium and molybdenum into each other. The second material has a thermal conductivity of at least 50 W/mK. Some examples of materials that can be used as the second material include copper, silicon and aluminum.

Figure 4:
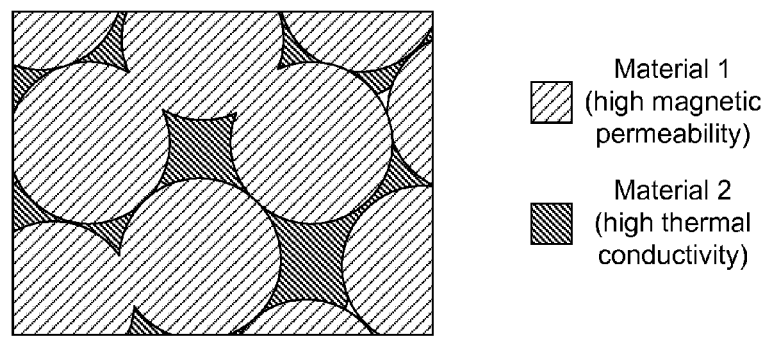
FIG. 4 is a diagram illustrating the general structure of a composite material formed by pressing particles of two materials together at elevated temperatures and pressures.

Powder metallurgy techniques are used to combine the first and second materials order to retain the individual characters of the different materials (i.e., the high magnetic permeability of the first material and the high thermal conductivity of the second material). In the composite material that is formed by combining these two materials, a portion of the volume is occupied by the first material, and a portion of the volume is occupied by the second material. Referring to FIG. 4, a diagram illustrating the structure of the composite material is shown. It should be noted that the compounds of material may also include some voids in the structure. For instance, the voids may comprise 1% to 2% of the volume of the composite material. The voids may provide some electrical resistance in the composite material, which may be a desirable characteristic.

Figure 5:
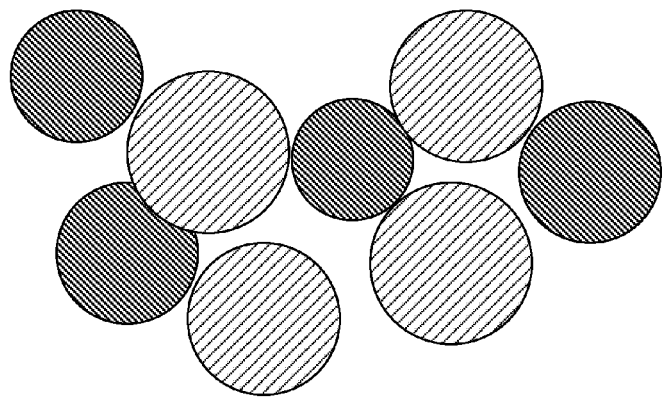
FIG. 5 is a diagram illustrating the mixing of two powdered materials prior to pressing the materials together to form a composite material.
Figure 6:
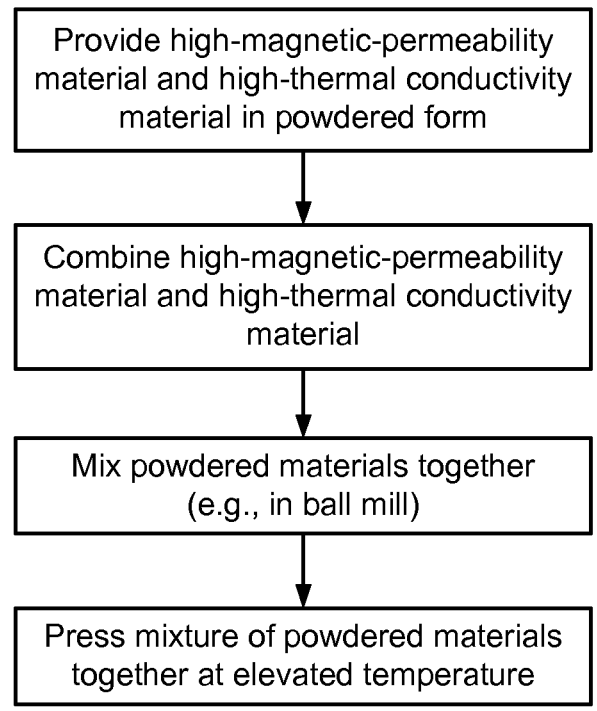
FIG. 6 is a flow diagram illustrating a method for manufacturing a composite material wherein particles of two powdered materials are mixed before they are pressed together to form a composite material.

The first and second materials can be combined in several ways. For example, in a first process, each of the first and second materials is provided in a powdered form. The sizes of the powder particles may vary. In one embodiment, the particles are approximately 100 microns in diameter. The powders are mixed together in a desired ratio with a binder. The materials are milled together to mix the particles of the two powders. This is represented by the diagram of FIG. 5, which shows several interspersed particles of the two materials. The mixed powder is then placed in a mold or die, and is pressed at an elevated temperature. The elevated temperature and pressure fuse the particles of the two materials together, as shown in FIG. 4. It should be noted that the materials are not sintered. Although the temperature is elevated, it is not hot enough to melt the materials together, and consequently does not form a new alloy or compound. Instead, the two materials remain separate and distinct, and the characteristics of each of the original materials are maintained. Thus, the particles of the first material still provide this material's characteristic high magnetic permeability, while the particles of the second material still provide its characteristic high thermal conductivity. This process is summarized in FIG. 6.

Figure 7:
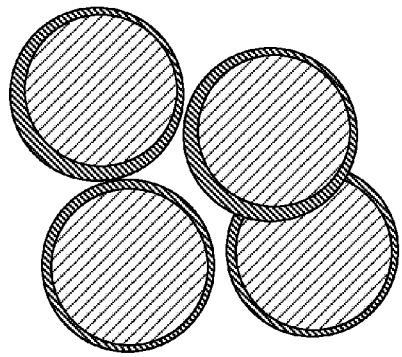
FIG. 7 is a diagram illustrating the coating of a first material with a uniform layer of a second material prior to pressing the materials together to form a composite material.
Figure 8:
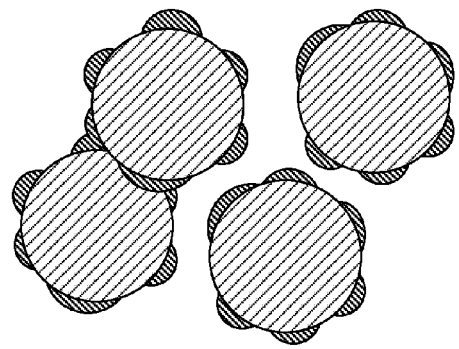
FIG. 8 is a diagram illustrating the coating of a first material with an uneven coating of a second material prior to pressing the materials together to form a composite material.
Figure 9:
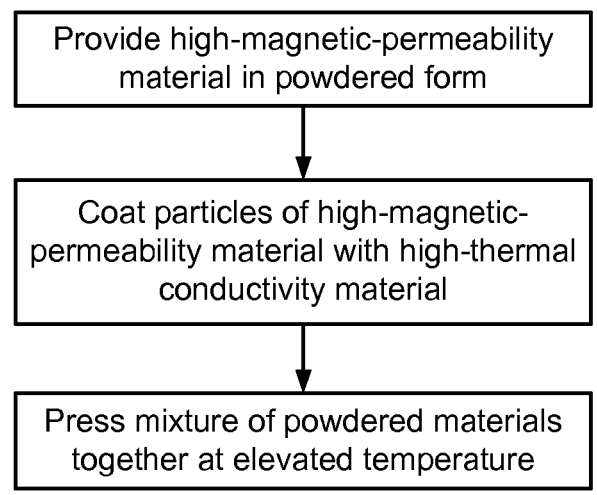
FIG. 9 is a flow diagram illustrating a method for manufacturing a composite material wherein particles of a first material are coated with a second material before they are pressed together to form a composite material.

In an alternative process, particles of one of the materials can be coated with the other material before pressing the particles together to form the composite material. Because the magnetic permeability of the composite material is generally considered to be of higher importance than the thermal conductivity, it is preferred that the articles of the first material (which has the high magnetic permeability) are coated with the second material (which has the high thermal conductivity). The coating of the particles can be more uniform (as shown, for example, in FIG. 7), or it can be less uniform (as shown, for example, in FIG. 8). It is contemplated that the less uniform coating of the particles will provide better performance, as the uniform coating of the high-magnetic-permeability particles with a material having a lower magnetic permeability may create flux barriers. These barriers may reduce the magnetic flux through the high-magnetic-permeability material, thereby reducing the overall magnetic permeability of the composite material. The coated particles are then placed in a suitable mold or die and are pressed together at an elevated temperature. As noted above, although the elevated temperature facilitates fusing the particles together, the temperature should be low enough that the two different materials do not melt together and thereby form a third material that has less desirable characteristics. It is instead desired to produce a composite material that incorporates both the first material and the second material, and thereby provides characteristics associated with these individual materials. This process is summarized in FIG. 9.

These and other embodiments of the invention may provide a number of advantages over the prior art. For instance, the use of the composite material enables the manufacture of laminations that have higher magnetic permeability and higher thermal conductivity than conventional laminations that are manufactured from a single type of material. The use of the composite material may reduce core losses in ESP motors, thereby increasing the efficiency of the motors. Further, because the composite material has increased thermal conductivity in comparison to conventionally manufactured laminations, the motor will more efficiently dissipate heat, enabling it to operate at a lower internal temperature and extending its operational life.

There may be many different embodiments of the present invention, including downhole (e.g., ESP) motors, individual laminations for use in downhole motors, processes for manufacturing laminations, etc.

One exemplary embodiment is a lamination for a downhole motor, wherein the lamination comprises a thin angular disc formed from a composite material. The composite material includes a first material having a magnetic permeability of at least 3000 SI units and a second material having a thermal conductivity of at least 50 W/mK, wherein the first material occupies a first portion of the volume of the composite material, and the second material occupies a second portion of the volume of the composite material. The composite material may also include voids that occupy 1% to 2% of the volume of the composite material.

Another exemplary embodiment is a motor for an ESP, wherein the motor has a stator core that is formed by stacking multiple composite laminations within a housing. Each lamination is a thin angular disc from a composite that incorporates the first material having a high magnetic permeability and a second material having a high thermal conductivity. Particles of each of the first and second materials are fused together in the composite, but each of the first and second materials is separate, and each of the first and second materials retains its individual material characteristics.

Yet another exemplary embodiment is a process for forming a lamination for use in a downhole motor. The process includes providing, in powdered form, a first material that has a high magnetic permeability and a second material that has a high thermal conductivity. The particles of the first and second materials are mixed together and are pressed, at an elevated temperature, into the shape of a lamination for the motor. The pressure and temperature are sufficient to fuse the particles of the first and second materials together, without combining the first and second materials into a third material that does not have the individual characteristics of the first and second materials.

Still other embodiments are also possible. For example, although the foregoing description is directed primarily to laminations used in a stator core, laminations for rotors could be constructed using the same techniques. Further, these techniques could be used to manufacture components other than magnetic core laminations. The components may have any desired shape and, depending upon the purpose of the component, the materials may be selected for characteristics other than magnetic permeability and thermal conductivity.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A method for manufacturing magnetic core laminations, the method comprising:
   providing a first material having a predetermined magnetic permeability;
   providing a second material having a predetermined thermal conductivity;
   interspersing particles of the first and second materials; and
   pressing the particles together in a predetermined shape of a magnetic core lamination, thereby binding the particles to each other and forming a composite material having the predetermined shape of the magnetic core lamination, wherein characteristics of the magnetic permeability and thermal conductivity of the first and second materials in first and second volumes remain distinct.

2. The method of claim 1, wherein a first portion of a volume of a composite material comprises the first material and retains the magnetic permeability of the first material.

3. The method of claim 1, wherein a second portion of a volume of a composite material comprises the second material and retains the thermal conductivity of the second material.

4. The method of claim 1, wherein a third portion of a volume of a composite material, which comprising the first and second materials, comprises voids.

5. The method of claim 4, wherein the third portion comprises between 1% and 2% of the volume of the composite material.

6. The method of claim 1, wherein the particles are pressed together at a predetermined temperature to fuse the particles to each other.

7. The method of claim 6, wherein the particles are pressed together at the predetermined temperature that is not to sinter the particles.

8. The method of claim 6, wherein the particles are pressed together at the predetermined of less than a sintering temperature of the first material and a sintering temperature of the second material.

9. The method of claim 1, wherein interspersing the particles of the first and second materials comprises milling together the particles of the first and second materials with a binder material.

10. The method of claim 1, wherein interspersing the particles of the first and second materials comprises coating particles of one of the first and second materials with the other of the first and second materials prior to pressing the particles together in the predetermined shape of the magnetic core lamination.

11. The method of claim 10, wherein the particles of the one of the first and second materials are evenly coated with the other of the first and second materials.

12. The method of claim 10, wherein the particles of the one of the first and second materials are unevenly coated with the other of the first and second materials.

13. An apparatus comprising:
   an electric submersible pump motor having a magnetic core;
   wherein the magnetic core includes a plurality of laminations, each lamination being formed of a composite material;
   wherein a first portion of a volume of the composite material comprises particles of is a first material having a corresponding magnetic permeability;
   wherein a second portion of the volume of the composite material comprises particles of is a second material having a corresponding thermal conductivity;
   wherein the particles of the first and second materials are interspersed wherein the first portion of the volume of the composite material is distinct from the second portion of the volume of the composite material, and
   wherein characteristics of the magnetic permeability and thermal conductivity of the first and second materials in first and second volumes remain distinct.

14. The apparatus of claim 13, wherein the first portion of a volume of the composite material comprises particles of the first material and the second portion of a volume of the composite material comprises particles of the second material, and wherein the particles of the first and second materials are fused together.

15. The apparatus of claim 14, wherein the particles of the first and second materials are non-sintered.

16. The apparatus of claim 13, wherein a third portion of the volume of the composite material comprises voids.

17. The apparatus of claim 16, wherein the third portion comprises between 1% and 2% of the total volume of the composite material.

18. The apparatus of claim 13, wherein the first material has a magnetic permeability of at least 3000 SI units and the second material has a thermal conductivity of at least 50 W/mK.

19. The apparatus of claim 18, wherein the second material has a magnetic permeability of less than 3000 SI units and the first material has a thermal conductivity of less than 50 W/mK.

\* \* \* \* \*